Jan. 17, 1967  A. M. SMITH II  3,298,080
METHOD OF MAKING NEEDLED FABRIC STRUCTURE
Original Filed Oct. 4, 1961  2 Sheets-Sheet 1
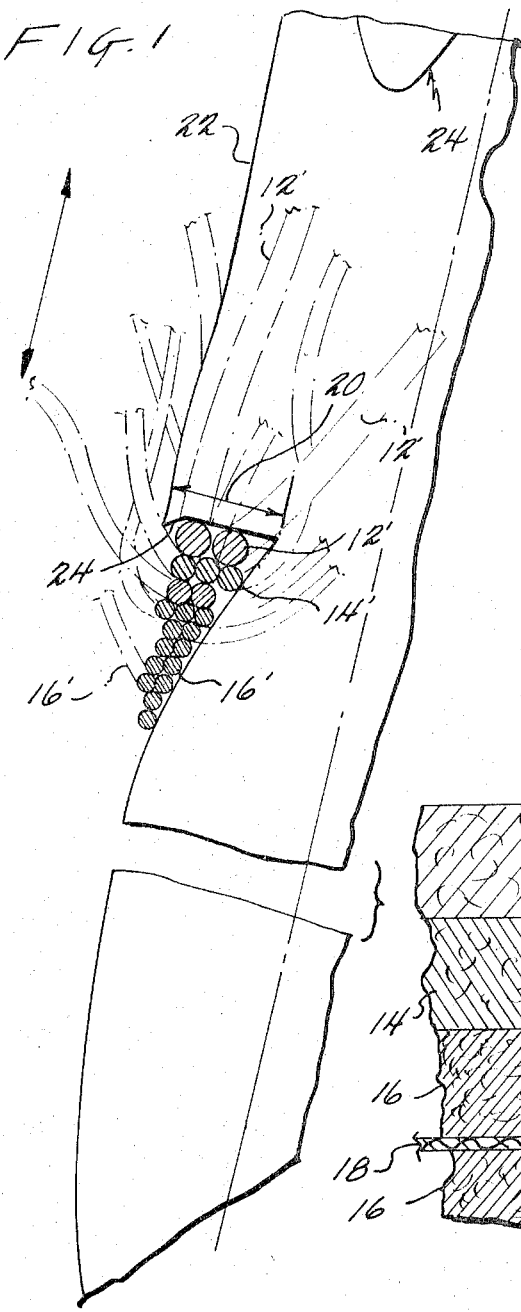
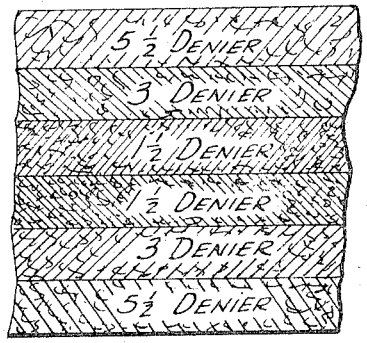
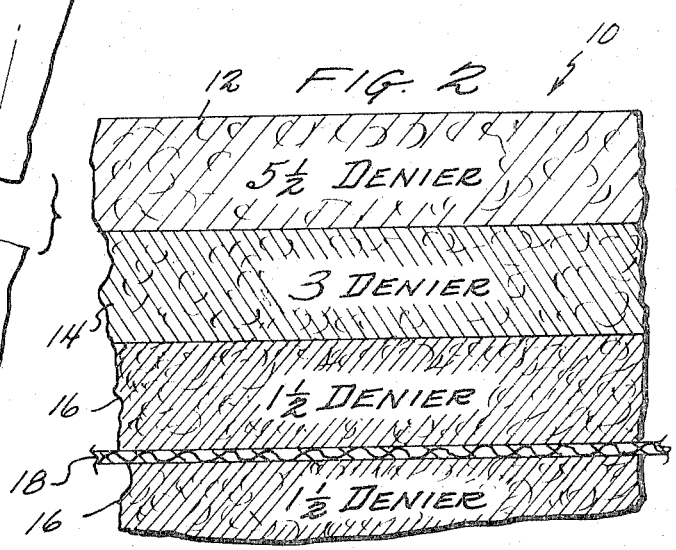
INVENTOR.
ALEXANDER M. SMITH II
BY
Cushman, Darby & Cushman
ATTORNEYS Jan. 17, 1967    A. M. SMITH II    3,298,080
METHOD OF MAKING NEEDLED FABRIC STRUCTURE
Original Filed Oct. 4, 1961    2 Sheets-Sheet 2
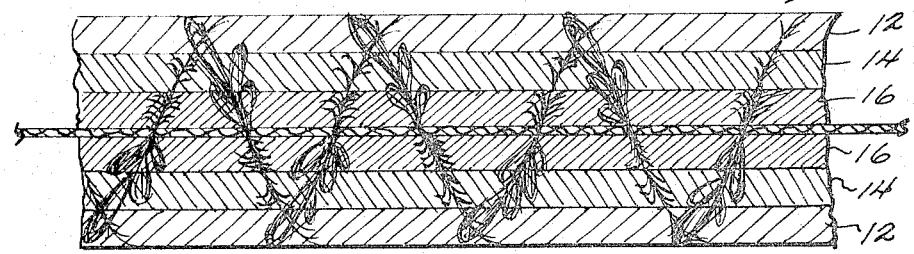
FIG. 3
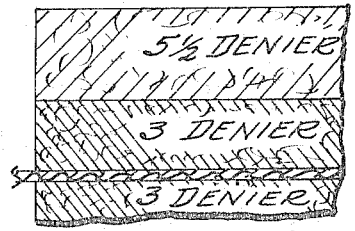
FIG. 2A
FIG. 7
| ACRLYIC |
| POLYPROPLENE |
| RAYON OR NYLON |
| SCRIM |
FIG. 6
| ACRLYIC |
| RAYON OR NYLON |
| RAYON OR NYLON |
| SCRIM |
FIG. 5
| WOOL |
| RAYON |
| RAYON |
| SCRIM |
FIG. 4
| RAYON | ABOUT 5½ DENIER |
| RAYON | ABOUT 3½ DENIER |
| RAYON | ABOUT 1½ DENIER |
| SCRIM | |
INVENTOR.
ALEXANDER M. SMITH II
BY
Cushman, Darby & Cushman
ATTORNEYS United States Patent Office 3,298,080
Patented Jan. 17, 1967

3,298,080
METHOD OF MAKING NEEDLED FABRIC STRUCTURE
Alexander M. Smith II, Elkin, N.C., assignor, by mesne assignments, to The Fiberwoven Corporation, Elkin, N.C., a corporation of North Carolina
Original application Oct. 4, 1961, Ser. No. 142,950, now Patent No. 3,206,351, dated Sept. 14, 1965. Divided and this application May 24, 1965, Ser. No. 470,950
6 Claims. (Cl. 28—72.2)

This application is a division of my copending application, Serial No. 142,950, filed October 4, 1961, now U.S. Patent 3,206,351 and is entitled to the filing date thereof.

The present invention relates to an improved needled fabric structure and the method or process of making the same. More particularly, the invention relates to a novel needled fabric structure made from a web composed of layers of fibers oriented in a particular manner, the layers of fibers having a gradient whereby needling of the web results in orientation of fibers in a particular manner to obtain a desired cohering fiber entanglement and fabric strength.

Needled fabric structures, which are often-times referred to as non-woven fabric structures, generally derive their coherence and strength from inner fiber entanglement and accompanying frictional forces of the fibers. Heretofore, needling has been utilized primarily in the manufacture of felts or felt-like products which have limited use because of a lack of tensile strength, uniformity of appearance, hand, and the like. In recent years, considerable effort has been directed toward the use of synthetic or man-made fibers to produce a needled fabric structure capable of a wide variety of uses. The heretofore efforts in producing a needled fabric structure have included orienting the fibers of the layers into parallelism within the layers, adjacent layers having the direction of the individual fibers at an angle to each other. The fibers in the layers were then forceably oriented by needling so that some of the fibers were rearranged perpendicular to the surface of the web. These prior efforts of producing a non-woven unbonded fabric structure have not been entirely satisfactory as the high tensile strength necessary for certain desired uses of the fabric as well as opacity could not be obtained. More recently, bonding agents have been used after needling for giving additional strength to the fabric structure by bonding together the entangled fibers after needling. The use of bonding agents has a disadvantage in the overall process of making a fabric structure as it increases the cost, time of manufacture, and oftentimes produces a poor hand.

An object of the present invention is to provide a novel needled fabric having high tensile strength, both before and after napping.

Another object of the present invention is to provide a needled fabric structure capable of being napped and still maintaining its high tensile strength after napping.

A further object of the present invention is to provide a method of producing a needled fabric structure capable of napping yet still having a high tensile strength, uniform, dense, and smooth cover appearance, better opacity and a softer hand.

An important object of the present invention is to provide a needled fabric structure wherein fiber entanglement and coherence is controlled in a manner to increase the strength and stability of the core or center portion of the fabric structure and still permit napping without materially affecting such strength and stability.

A still further object of the present invention is to provide a needled fabric structure and the method of making the same, the fabric structure having characteristics of a premium fabric while using approximately 6% to 35% of premium fibers.

These and other objects and advantages of the present invention will appear more fully in the following specification, claims, and drawings in which:

FIGURE 1 is an enlarged fragmentary elevational view of a conventional needle of a needle loom, the view illustrating fiber pick-up of one of the barbs of the needle as the needle penetrates a web to make the novel fabric structure of the present invention;

FIGURE 2 is a fragmentary, sectional view through a web composed of a plurality of layers of fibers, the layers having a fiber gradient which results in the novel fabric structure and method of making the same of the present invention;

FIGURE 2a is a view similar to FIGURE 2 but illustrating using two layers of fibers having a fiber gradient on each side of a foundation;

FIGURE 2b is a view similar to FIGURE 2 but on a reduced scale and illustrating a web composed of a plurality of layers of fibers, the layers having a fiber gradient which results in the novel fabric structure of the present invention without the use of a foundation web;

FIGURE 3 is a cross-sectional schematic view of the needled fabric structure of the present invention and illustrating the novel orientation of the fibers into cohering fiber entanglement after needling;

FIGURES 4 through 7 are diagrammatic views illustrating examples of layer structure of webs from the outer layer toward the scrim which are capable of being used in the novel method and producing the novel needled fabric structure of the present invention.

In the manufacture of non-woven fabrics, the fibers are produced into a web of loosely matted fibers by conventional cards, garnettes or by air deposition. The webs of loosely matted fibers in card systems usually have all of the fibers extending predominately lengthwise of the web. A composite web or batt of suitable thickness may be made from a plurality of webs formed in superimposed layers, there being sufficient layers for the composite web to have a desired thickness for needling. On the other hand, cross-laid equipment is often used to provide cross-lapping so that the composite batt will have the fibers extending predominately widthwise of the same.

Usually a foundation web or scrim is interposed between the layers of loosely matted fibers, the foundation web or scrim providing a means for properly arranging the layers with respect to one another. The foundation web or scrim may also provide some strength to the resulting fabric structure, although the main strength of the resulting fabric structure occurs from inner fiber entanglement. As used throughout the specification, the foundation web or scrim may be warp yarn with or without fillings or slivers and rovings with or without fillings.

The formation of the composite web or batt, as heretofore mentioned, includes layers of fibers on either side of the foundation web, it being understood that the forcible orientation of the fibers in the layers is through the foundation.

Heretofore, needling of such batts by needles having a plurality of barbs have contemplated forcibly orienting the fibers to a position where they are perpendicular with respect to the plane of the batt. While such prior needling processes contemplated deriving some fiber entanglement from the random needling of the batt from both sides, such needling primarily accomplished compacting the batt of loosely matted fibers. The more the batt was needled, the more compacted or denser structure resulted. However, controlled fiber entanglement was not obtained in a center portion of the fabric structure as the barbs of the needles as they entered the batt filled up with fibers from the outer or surface layer of fibers, forcibly driving the same into entanglement with fibers in the center portion of the fabric structure. As the barbs progressed through the batt and because they filled up with outer or surface layer fibers, they did not forcibly orient the fibers in the inner portion of the batt into a cohering entanglement with each other or into cohering entanglement with fibers on the side opposite the side of penetration. When the outer surfaces of the resulting fabric structure was napped, the fibers in the outer layers which had been driven inwardly into interlooping and cohering entanglement were picked at by the napping needles, breaking the entanglement with the fibers of the inner layers, and thus destroying the stability and strength of the original structure.

The present invention broadly contemplates needling a batt of loosely matted fibers in such a manner that fibers from the outer areas of the batt as well as more fibers from the inner areas of the batt are forcibly oriented into cohering fiber entanglement which produces a core in the resulting fiber structure that has high tensile strength and stability even after napping on both surfaces. In this respect, the present invention contemplates inserting the needles into the batt from both sides of the same so that as the barbs of the needles pass through the batt, they pick up an increasing number of fibers as they approach the center of the batt. In other words, as the individual barb passes downwardly through the batt, it will pick up a certain number of fibers from the outer layer, more fibers from the inner layer or layers so that maximum fiber entanglement caused by forcible orientation of fibers is obtained in the core of the fabric structure.

The resulting fabric structure of the present invention provides outer surfaces which can then be uniformly napped and, while the napping process on the surfaces of the fabric structure will break some of the fiber entanglements of the fibers forcibly oriented from the outer layer, this does not destroy or affect the forcible fiber entanglements in the inner or center portion of the fabric structure as these fiber entanglements are predominantly fibers from layers in the center portion of the fabric structure. The fiber entanglements in the core of the fabric structure have some entanglement with fibers from the outer layers and, consequently, maintain the outer surface fibers even after napping in a stable position with respect to the fabric structure.

In order to accomplish the method of the present invention and produce the novel needled fabric structure of the same, the layers of fibers to be needled have a gradient characteristic as the layers approach the center of the batt or the foundation of the batt which will result in the individual barbs of the needles each picking up fibers in a progressively increasing number from each of the layers of the composite batt as the barbs approach the center of the batt. In more detail, the needle pick-up in the above-described manner can be obtained by utilizing (1) a gradient dependent on fiber denier where decreasing denier of the particular fibers used is related to decreasing cross-sectional area of the fibers as shown in FIGURE 1 (2) a gradient dependent on fiber stiffness (3) a gradient dependent on fiber friction and (4) a combination of these fiber gradients.

While the layers of the batt of the present invention will be referred to as webs superimposed upon one another to form the composite batt, it is, of course, within the scope of the present invention that the term "layers" should be interpreted broadly enough to cover a web formed of fibers having desired gradient characteristics throughout the thickness of the web.

The specific apparatus and method of needling may be of the type disclosed in my copending applications Serial Nos. 29,115 and 31,910, filed May 13, 1960 and May 26, 1960, respectively, now United States Patent Nos. 3,090,099 and 3,090,100, respectively. In the aforementioned applications for "Needle Punch Machines and Method," there is disclosed a method resulting in a needled fabric structure having a chain entanglement of fibers resulting from a particular manner of interlooping and interlacing of fibers by needle punching a batt of loosely matted fibers from opposite sides thereof. The particular co-operation of the needling of the batt first from one side and then from the other side, as disclosed in the aforementioned applications, is capable of being applied to the application of the present invention and the subject matter of these applications to this extent is incorporated in this application by reference.

The following examples illustrate, more specifically, the practice of the present invention in order to obtain needle pick-up by utilizing the fiber denier gradient and the fiber stiffness gradient.

*Example 1*

A batt was formed of three layers of fibers on each side of a scrim, the layers having fibers of different denier as they approached the scrim, the corresponding layers on opposite sides of the scrim having fibers of the same denier, respectively. Referring to FIGURE 2, which discloses the batt 10 prior to needling, the outer layer 12 was made up of rayon fibers laid cross-wise of the web and having a fiber denier of about 5½. The diameter of the individual rayon fibers was approximately 0.8 mils. The intermediate layer 14 was made up of rayon fibers, also cross-laid with respect to the length of the batt, the rayon fibers having a denier of about 3. The diameter of the fibers in the intermediate layer 14 was approximately 0.6 mils. The inner layer 16 was made up of rayon fibers having a fiber denier of about 1½ with a resulting fiber diameter of 0.4 mils.

The fiber layers on the other side of the scrim 18 were identically arranged with respect to the scrim as were the above-described three fiber layers 12, 14 and 16.

The batt 10 was penetrated by an array of needles from both sides of the same, the batt being advanced through the array of needles, as described in my aforementioned application Serial No. 31,910. The needles of the array of needles were conventional and provided with a plurality of barbs having throat depths 20, as shown in FIGURE 1, of 2.5 to 3.0 mils. Each needle reciprocates along its centerline as shown by the double-headed arrow of FIG. 1.

As the needle 22 penetrated through the batt, each barb 24 picked up approximately 2 to 5 fibers 12' from layer 12, 6 to 10 fibers 14' from layer 14, and 13 to 18 fibers 16' from layer 16. The barbs 24, as they passed through the scrim, were substantially loaded with fibers and oriented these fibers, as diagrammatically shown in FIGURE 3. In FIGURE 3, it will be noted that the interlacing and interlooping of fibers from the layers 12, 14, 16 provides a chain entanglement lengthwise throughout the needle batt 10, as described in my aforementioned applications, but, in the improved structure shown, fiber pick-up and subsequent entanglement caused by forcible orientation of fibers progressively increases toward the scrim or center line of the needled batt.

While FIGURE 4 discloses ½ of a batt from the scrim line out to one surface, needled as described above and utilizing all rayon fibers but the fibers of the different layers having different denier, a fabric structure was also made by utilizing different fibers arranged as shown in FIGURES 5, 6 and 7, the fibers having the same denier gradient from the outside surface of the batt toward this center. In each instance, there was an increasing number of fibers picked up by the needle barbs as the needle barbs approached the center of the batt, thus resulting in more fiber entanglement in the core of the batt.

Also, a batt such as shown in FIGURE 2a and having two layers of fibers on each side of the scrim was needled as described. The outer layers had fibers of 5½ denier whereas the inner layers had fibers of 3 denier and such a gradient also resulted in a fabric structure after needling having uniform napping properties on both surfaces as well as the tensile strength after napping substantially with the range of the tensile strength of a woven fabric of the same weight and material.

Example 2

A fabric structure was made by utilizing a fiber stiffness gradient between the layers of the fibers, the stiffness of the fibers of the outer layers being greater than the stiffness of the fibers of the inner layers. In this example, the denier of the fibers in the outer layer, intermediate layer and inner layer on each side of the scrim was staple for the fiber used. Acrylic fibers were used in the outer layers, rayon fibers were used in the intermediate layers and other rayon fibers not as stiff as the rayon fibers of intermediate layers were used in the inner layers. As the needles passed through the batt, the barbs of the needles picked up a few of the relatively stiff acrylic fibers in the outer layer, more of the rayon fibers in the intermediate layer and still more of the rayon fibers in the inner layer. The resulting needled fabric structure had substantially the identical fiber entanglement as the fabric structure described under Example 1 above. There was more fiber entanglement caused by forcible orientation of fibers in the center or core portion of the fabric structure by fibers taken from the inner rather than outer or surface layers, thus providing more core strength and fabric stability after napping.

Instead of using rayon fibers for the intermediate and inner layers of fibers, a needled fabric structure was made by utilizing nylon fibers in the intermediate and inner layers with an acrylic fiber in the outer layers. The nylon fibers of the intermediate layers were less stiff than the acrylic fibers, whereas the nylon fibers of the inner layers were less stiff than the nylon fibers in the intermediate layers. The barb pick-up of the needles was substantially identical to that heretofore described in Example 1 in that the barb picked up progressively more fibers from each layer as its path approached the center or scrim of the batt. The needling was accomplished from both sides of the fabric in the manner described in my aforementioned application Serial No. 31,910.

While the two examples described above utilized certain synthetic and man-made fibers, as well as the natural fiber of wool, the use of these particular fibers is not intended to exclude other synthetic and natural fibers. Such other fibers can be utilized as long as the batt formed has either a fiber denier gradient, a fiber stiffness gradient or a fiber friction gradient whereby needle pick-up of fibers progressively increases toward the center or core of the batt and loading barbs with fibers from just the outer layers is prevented.

Fabric structures made according to the present invention have particular utility in the making of blankets, wearing apparel, bedspreads, draperies, and other consumer products. The fabric structure can have either or both surfaces napped and, when napped, the structure will have high tensile strength as well as opacity, hand and uniform appearance on both sides. Opacity is accomplished because of the tight fiber entanglement in the center of the fabric structure which is untouched during the napping operation.

The terminology used in this specification is for the purpose of description and not limitation, the scope of the invention being defined in the claims.

What is claimed is:

1. A method of producing a needled fabric comprising the steps of: forming a batt of loosely matted fibers from a plurality of superimposed layers of individual fibers, forcibly orienting fibers from one side of the batt toward the other side in a plurality of individual paths by increasing the number of fibers oriented from each layer in each path to progressively increase fiber entanglement as the path approaches the center of the batt, and forcibly orienting fibers from the other side of the batt toward the first side in a plurality of individual paths by increasing the number of fibers oriented from each layer in each path to progressively increase fiber entanglement as the path approaches the center of the batt.

2. A method of producing a needled fabric comprising the steps of: forming a batt of loosely matted fibers by arranging a plurality of superimposed layers of individual fibers, with the individual fibers of each of the layers extending generally cross-wise of the batt, forcibly orienting fibers from one side of the batt toward the other side in a plurality of individual paths by increasing the number of fibers oriented from each layer in each path to progressively increase fiber entanglement as the path approaches the center of the batt, orienting fibers from the other side of the batt toward the first side in a plurality of individual paths by increasing the number of fibers oriented from each layer in each path to progressively increase fiber entanglement as the path approaches the center of the batt.

3. A method of producing a needled fabric comprising the steps of: forming a batt of loosely matted fibers by arranging a plurality of superimposed layers of individual fibers, with individual fibers of each of the layers extending generally cross-wise of the batt, forcibly orienting fibers from one side of the batt toward the other side in a plurality of individual paths each extending at an acute angle to a median plane through the batt and lying in a plane parallel to the warp-wise axis of the batt, the number of fibers picked up from each layer increasing as the paths approach the center of the batt; and forcibly orienting fibers from the other side of the batt toward the first side in a plurality of individual paths, each extending at an acute angle to the median plane through the batt and lying in a plane parallel to the warp-wise axis of the batt, the number of fibers picked up from each layer increasing as the paths approach the center of the batt.

4. The method of claim 3 wherein some fibers forcibly oriented into an outer layer of the batt are reoriented back toward the center of the batt thereby causing a chain entanglement of fibers in a plurality of warp-wise rows extending side by side.

5. A method of producing a needled fabric comprising the steps of: forming a batt of loosely matted fibers by arranging a plurality of superimposed layers of individual fibers, the fibers in the outer layers having greater resistance to needle pick-up than the fibers in inner layers; forceably orienting fibers from one side of the batt toward the other side in a plurality of individual paths with the fibers picked up from each layer increasing as the paths approach the center of the batt; forceably orienting fibers from the other side of the batt toward the first side in a plurality of individual paths with the fibers picked up from each layer increasing as the paths approach the center of the batt; and forceably reorienting some of the fibers previously oriented in each outer layer of the batt back towards the center of the batt thereby causing a chain entanglement of fibers in a plurality of warp-wise rows extending side by side.

6. A method as claimed in claim 5 in which the individual fibers of the layers are arranged to extend generally cross-wise of the batt when the batt is formed.

References Cited by the Examiner

UNITED STATES PATENTS

| | | | |
|---|---|---|---|
| 2,377,564 | 6/1945 | Lundgren | 28—72.2 X |
| 3,022,813 | 2/1962 | Glover | 28—72.2 X |
| 3,085,309 | 4/1963 | Olson | 28—72.2 X |

MERVIN STEIN, *Primary Examiner.*

ROBERT R. MACKEY, *Examiner.*

L. K. RIMRODT, *Assistant Examiner.*